(12) United States Patent
Jensen et al.

(10) Patent No.: US 10,769,565 B2
(45) Date of Patent: Sep. 8, 2020

(54) SYSTEM AND METHOD FOR OPTIMIZED NETWORK DEVICE REPORTING

(71) Applicant: Toshiba TEC Kabushiki Kaisha, Shinagawa-ku (JP)

(72) Inventors: Gareth Jensen, Lake Forest, CA (US); Brendon Wai, Lake Forest, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 153 days.

(21) Appl. No.: 16/158,727

(22) Filed: Oct. 12, 2018

(65) Prior Publication Data

US 2020/0118052 A1 Apr. 16, 2020

(51) Int. Cl.

| | |
|---|---|
| *G06F 15/173* | (2006.01) |
| *G06Q 10/06* | (2012.01) |
| *H04L 12/801* | (2013.01) |
| *H04N 1/00* | (2006.01) |
| *H04L 12/26* | (2006.01) |
| *G06K 9/62* | (2006.01) |
| *H04W 4/029* | (2018.01) |

(52) U.S. Cl.
CPC ..... *G06Q 10/06312* (2013.01); *G06K 9/6256* (2013.01); *H04L 43/08* (2013.01); *H04L 47/11* (2013.01); *H04L 47/12* (2013.01); *H04N 1/00954* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 7,233,933 B2 | 6/2007 | Horvitz et al. | |
| 9,762,758 B1* | 9/2017 | Wang | H04N 1/32625 |
| 2003/0123422 A1 | 7/2003 | Miya | |
| 2005/0039126 A1* | 2/2005 | Katano | G06F 9/451 |
| | | | 715/700 |
| 2005/0190398 A1* | 9/2005 | Nuggehalli | H04N 1/00217 |
| | | | 358/1.15 |
| 2010/0030874 A1* | 2/2010 | Ormond | H04L 43/50 |
| | | | 709/220 |
| 2011/0216359 A1* | 9/2011 | Kamisuwa | G06F 3/12 |
| | | | 358/1.15 |
| 2014/0082148 A1* | 3/2014 | Nakayama | H04L 67/2804 |
| | | | 709/219 |
| 2015/0341280 A1* | 11/2015 | Wang | H04L 67/325 |
| | | | 709/225 |
| 2016/0283167 A1* | 9/2016 | Yeung | G06Q 10/087 |

\* cited by examiner

*Primary Examiner* — Phyllis A Book
(74) *Attorney, Agent, or Firm* — Ulmer & Berne LLP (57) ABSTRACT

A system and method for a device reporting optimization includes a processor and associated memory and a network interface for data communication with a multifunction peripheral. Reporting schedule data is sent from the memory the multifunction peripheral via the network interface. The processor receives a plurality of service file sets from the multifunction peripheral via the network interface in accordance with the scheduled reporting. The processor determines a timing of receipt of each of the service file sets relative to timing specified the reporting schedule data and generates updated reporting schedule data in accordance with a determined timing. The processor then sends the updated reporting schedule data to the multifunction peripheral via the network interface.

20 Claims, 6 Drawing Sheets

SYSTEM AND METHOD FOR OPTIMIZED NETWORK DEVICE REPORTING

TECHNICAL FIELD

This application relates generally to monitoring of networked devices. The application relates more particularly to optimization of reporting times for multifunction peripherals to address network or device conditions.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Multifunction peripherals are powerful, complex devices that include a substantial array of mechanical parts under direction and control of an embedded computer, referred to as a controller. MFPs are typically used in a network environment, such as a local area network (LAN) and are shared for use by multiple individuals or employees. As is to be expected, over time MFPs may require servicing or repair. Servicing may include routine maintenance, addition, replacement or removal of document processing features or hardware. Maintenance may also include configuration changes or software changes or updates. Maintenance may require that a technician be dispatched on site.

In modern day office environments, MFPs are frequently supplied by a distributor who provides, under contract, any device maintenance that may be needed. In such a business model, user costs may be associated a device lease and service agreement. In some instances, some or all of a user's cost may be based on monitored device usage, such as copy count or print page count.

For the reasons noted above, it is desirable to have current information as to a MFPs status and usage.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In accordance with an example embodiment detailed below, a device reporting optimizer includes a processor and associated memory and a network interface for data communication with a multifunction peripheral. Schedule data is sent from the memory the multifunction peripheral via the network interface. The processor further receives a plurality of service file sets from the multifunction peripheral via the network interface in accordance with the scheduled reporting. The processor determines a timing of receipt of each of the service file sets relative to timing specified the reporting schedule data and generates updated reporting schedule data in accordance with a determined timing. The processor then sends the updated reporting schedule data to the multifunction peripheral via the network interface.

Monitoring of MFPs for device status or usage can be done over a network. Monitoring may be done remotely, such as via a wide area network (WAN) connection which may comprise the Internet. A device monitoring system, such as Toshiba's eBridge Cloud Connect application, provides a platform to which MFP devices can connect to and receive remote troubleshooting and maintenance. Using this technology, technicians no longer need to be on site to provide technical support. Rather, technicians and service providers can simply analyze service files sent from the devices and deliver patch fixes through the cloud platform. This provides the benefits of reducing cost on maintenance operations and improving customer experience with greater service responsiveness.

The execution of the workflow relies on reliable communications between device and the cloud platform. Devices in a device cloud suitably send up service files in batch operations during a scheduled maintenance window. Reporting is suitably done with a schedule dictated by temporal data which may comprised day, date, week, month year, time, time of day or interval. When a device communicates with the device cloud, the cloud sends a new time to connect and send up service files. A suitable reporting system comprises a Cache Array Routing Protocol (CARP) algorithm to determine a scheduled communication time for each device. This algorithm seeks to spread device communications with the cloud service evenly throughout the day to ensure balanced network utilization.

The CARP algorithm itself does not consider many other factors that might affect successful communication between devices and the cloud. Factors such as manual power off of devices by users and network failure which are less predictable and hard to account for, but often result in missed communication windows and data staleness in the cloud. For example, energy saving policies in the European region specify that devices such as MFPs need to be powered off during some low usage hours. In this case, the CARP algorithm may not perform well enough since its communication schedule recommendations do not adapt to such policies.

Utilizing vast amounts of data collectable from devices, example embodiments herein demonstrate use of artificial intelligence to understand the problematic devices with missed maintenance windows and offer schedule corrections. A machine learning model, suitably supervised or unsupervised, looks at past records as well as new data collected daily to analyze communication times or service files in order to determine a pattern, such as when the device is usually powered off. Based on its findings, the system suitably provides a device with an optimal scheduled communication period where communication success rate is predicted to be high.

A machine learning model can learn subtle relations between many different factors (parameters) and an associated outcome. In doing so, it can adjust its own behavior accordingly to provide the best predictions based on all current knowledge. For example, regular local network congestion might result in frequent communication failures within an area during certain periods of times. This pattern is recognized by the machine learning model to intelligently suggest communication times that avoid those congestion periods.

A machine learning model can utilize the latest data collected and adapt to real-world changes that are otherwise hard to account for. This could include changes in user behaviors, network condition fluctuation, policy changes, etc. By retraining on new information daily, the model can always provide up-to-date optimal recommendations.

Figure 1:
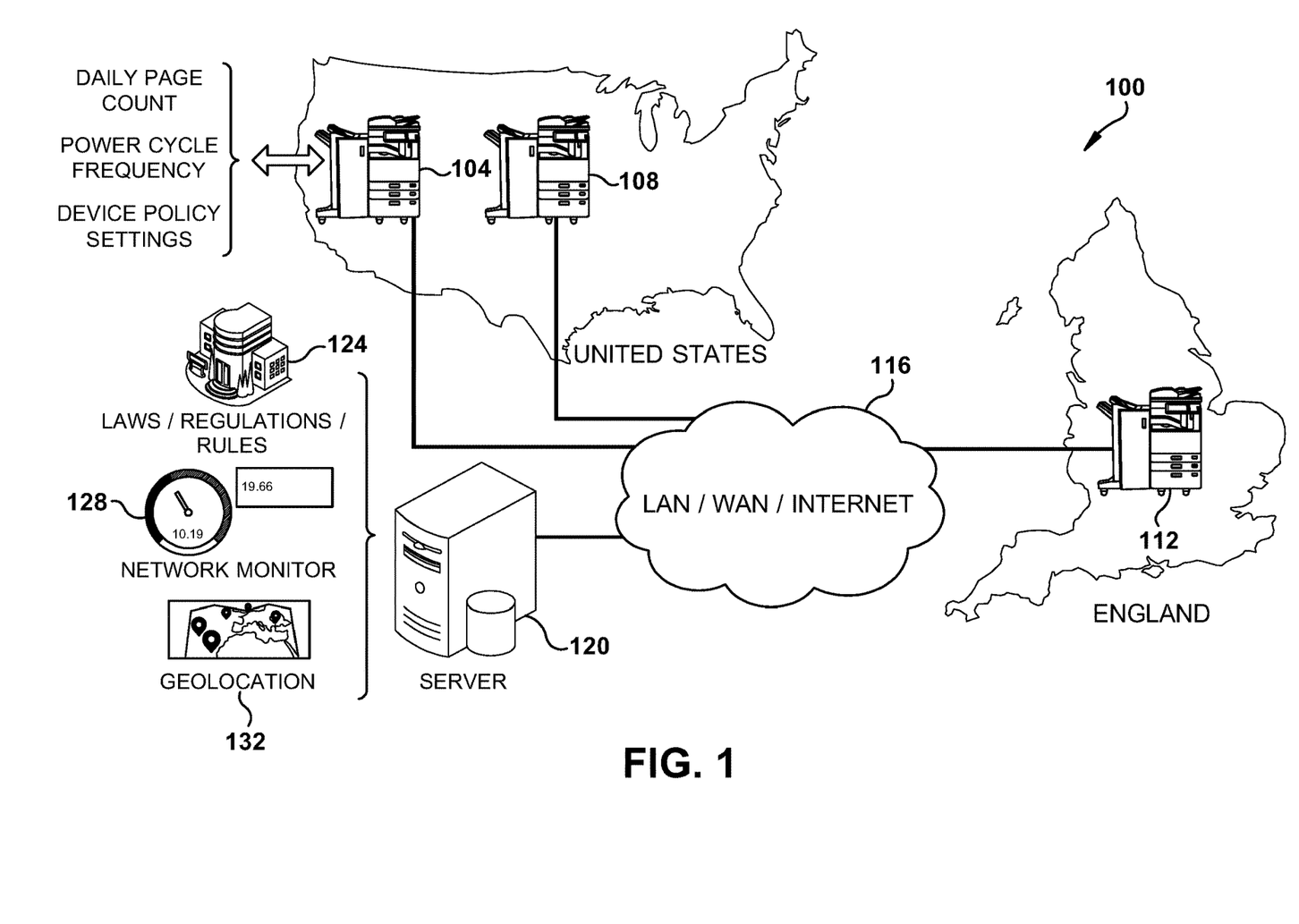
FIG. 1 is an example embodiment of a system for optimized device reporting scheduling.

In accordance with the subject application, FIG. 1 illustrates an example embodiment of a system 100 for optimized device reporting scheduling. A plurality of MFPs, illustrated by way of example by MFPs 104, 108 and 112, are in data communication with network cloud 116, suitably comprised of a LAN, WAN or Internet, alone or in combination. A cloud server system 120 provides for monitoring of network devices such as the MFPs 104, 108, and 112. MFPs 104 and 108 are located in the United States while MFP 112 is located in England. Thus, MFPs 104 and 108 may be subject to different laws, regulations or rules than MFP 112, which may be required to operate under governmental power saving rules that mandate devices go into low power or sleep mode after a set period of inactivity. MFPs 104 and 108, situated in a different country, may not be subject to such requirements.

MFPs 104, 108 and 112 periodically provide reports, such as device state, error conditions, device usage, copy counts, toner levels, error conditions, or power cycle timing or duration to cloud server 120. While information can be exchanged by a pull from server 120, it may be advantageous to instead have each MFP send a report at set time intervals. This alleviates a need for the server to have an accurate list of all reporting MFPs, and saves on system and network resources required to poll devices. Also, an MFP may not be available when the server polls it, requiring the server to flag the device for future attempts. MFP initiated reporting by comparison can complete reports in accordance with specified timing. However, certain factors may result in delayed reporting, such as when an MFP was powered off or in sleep mode during its scheduled reporting interval. Reporting could also be delayed by factors such as reporting during a time when there is high network congestion or other competition for hardware or network resources.

In the example of FIG. 1, server 120 communicates reporting schedules to each MFP 104, 108, 112 that reports to it. When a report arrives, the server 120 looks at the timing of receipt relative a particular device's current reporting schedule. A report from an MFP 104, 108, 112 may include items such as daily page count, power cycle frequency or device policy settings as illustrated with MFP 104. Server 120 also includes information such as laws, regulations or rules 124 which may impact on MFP availability for reporting, such as with the power saving features noted above. Server 120 also includes a network monitor, such as network speed monitor 128, to determine network congestion, such as congestion associated with receipt of a device's report. Server 120 is also provided with geolocation information 132 for monitored MFPs 104, 108, 112. Such location information may be provided by the MFPs 104, 108, 112 themselves, or through any suitable location system such as IP address tracking, GPS signaling, cell tower or cell sector location, Wi-Fi tracking, or the like. Providing server 120 with location information allows for determining which rules, such as power saving rules, might be applicable for a particular device or group of devices.

When server 120 is provided with the information as noted above, it determines an improved or optimized reporting schedule for individual devices, or groups of devices, and communicates it to such devices for their next reporting cycles. Continued monitoring and refinement is suitably ongoing. As detailed further below, server 120 uses artificial intelligence for report information and timing over time to determine delay trends or network congestion trends.

Figure 2:
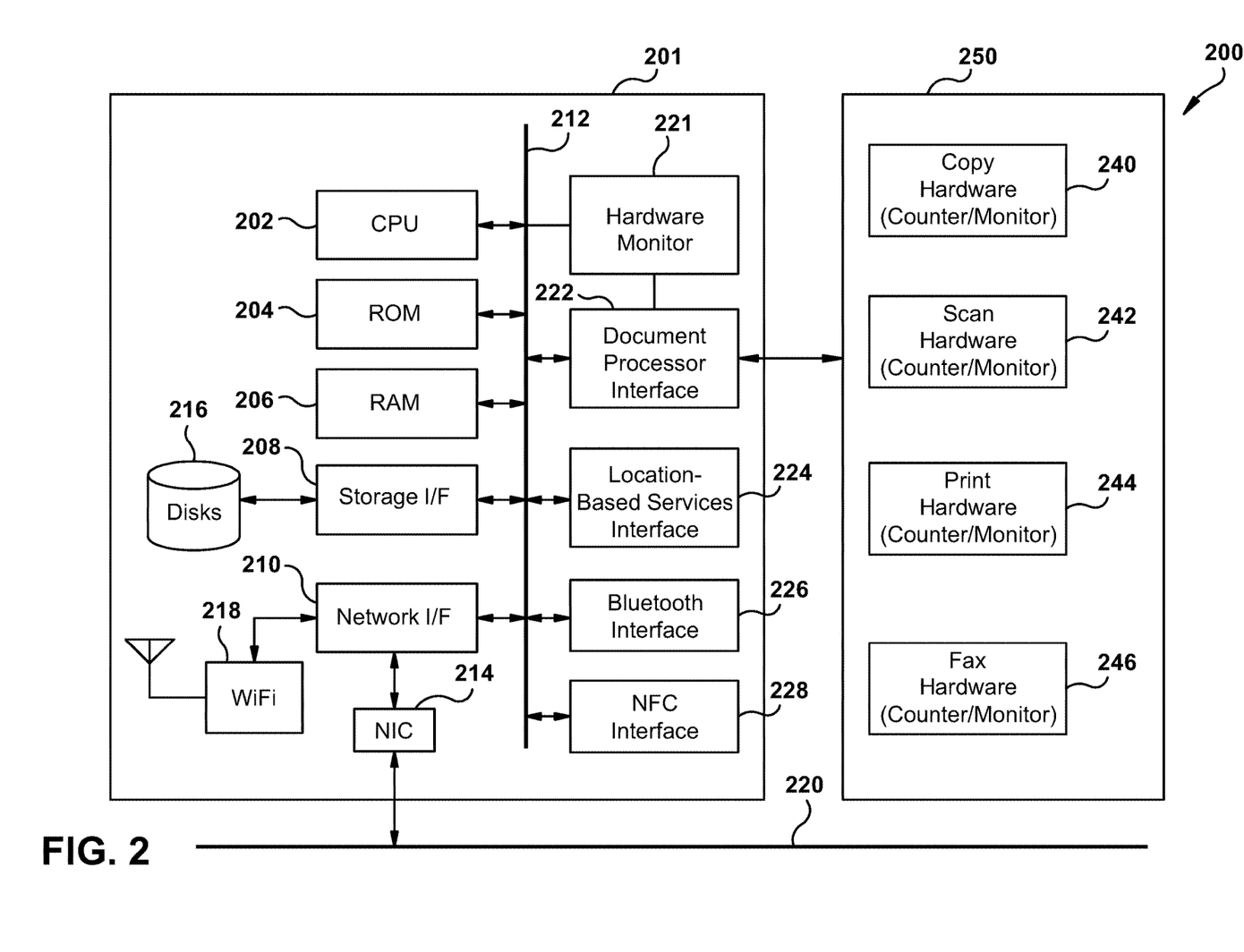
FIG. 2 is an example embodiment of a networked digital device such as a multifunction peripheral.

Turning now to FIG. 2 illustrated is an example embodiment of a networked digital device comprised of document rendering system 200 suitably comprised within an MFP, such as with MFPs 104, 108 and 112 of FIG. 1. It will be appreciated that an MFP includes an intelligent controller 201 which is itself a computer system. Thus, an MFP can itself function as a cloud server with the capabilities described herein.

Included in controller 201 and one or more processors, such as that illustrated by central processor unit (CPU) 202. Each processor is suitably associated with non-volatile memory, such as read only memory (ROM) 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, wireless universal serial bus (wireless USB), satellite, and the like. Example wired interfaces include Ethernet, USB, IEEE 1394 (FireWire), Lightning, telephone line, or the like. Processor 202 can also be in data communication with BLUETOOTH interface 226, and NFC interface 228, either directly as shown or through network interface 210 (not shown.)

Processor 202 can also be in data communication with any suitable user input/output (I/O) interface (not shown) which provides data communication with user peripherals, such as displays, keyboards, mice, track balls, touch screens, or the like. Hardware monitor 221 suitably provides device event data, working in concert with suitable monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216.

Also in data communication with data bus 212 is a document processor interface 222 suitable for data communication with MFP functional units 250. In the illustrate example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Additional interfaces suitably provided within controller 201 can include a location interface 224. Data relative to device location is suitably channeled to controller 201 via location interface 224 from any suitable location system. By way of example, location may be determined by Global Positioning System (GPS) information, cellular location information or network location information, or a combination thereof. Location information is also suitably determined outside of the MFP, such as by a technician who inputs device location information directly to the device.

Figure 3:
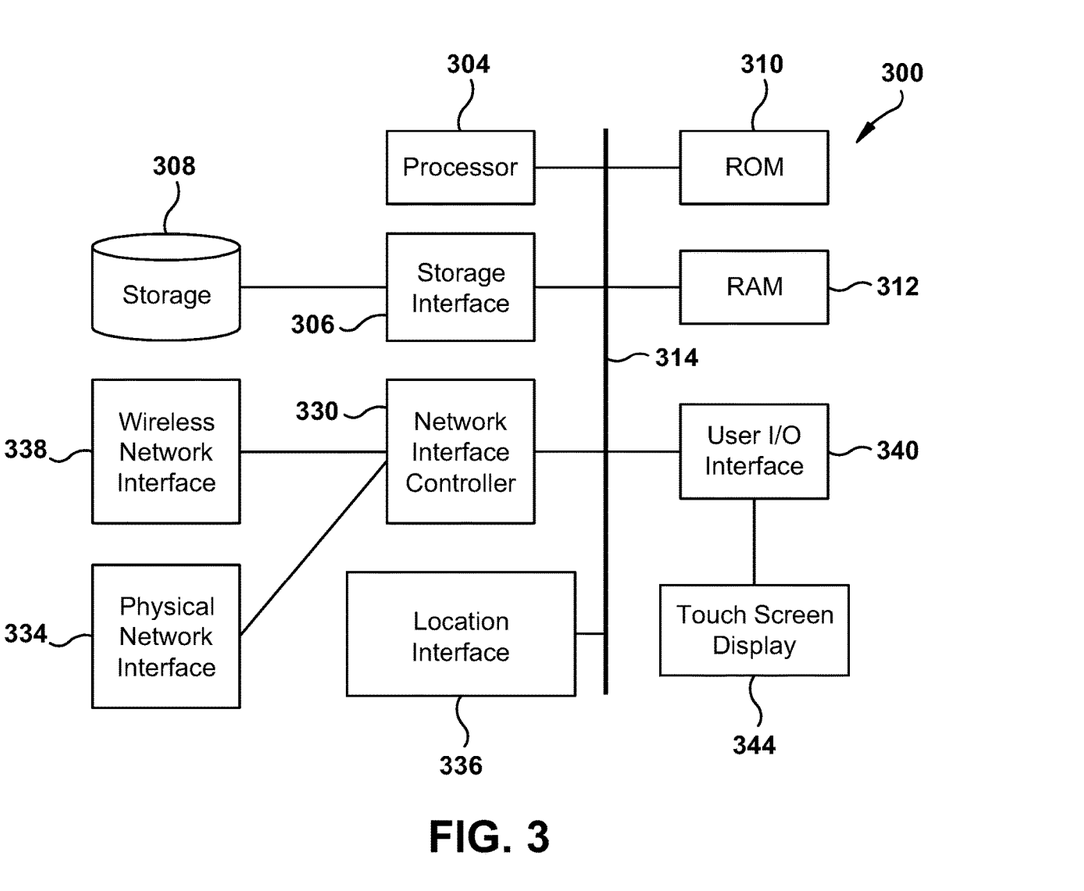
FIG. 3 is an example embodiment of a digital device.

Turning now to FIG. 3, illustrated is an example of a digital device system 300 suitably comprising networked data devices, such as server 120 of FIG. 1. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable wired or physical network connection via physical network interface 334 or to any suitable wireless data connection via wireless network interface 338, such as one or more of the networks detailed above. The system suitably uses location interface 336 for device geo-location, such as those described above. By way of example, if multiple error event management systems are used, it may be advantageous to have monitoring of devices completed by a local or more proximate event management system.

Processor 304 is also in data communication with a user input/output (I/O) interface 340 which provides data communication with user peripherals, such as display 344, as well as keyboards, mice, track balls, touch screens, or the like. It will be understood that functional units are suitably comprised of intelligent units, including any suitable hardware or software platform.

Figure 4:
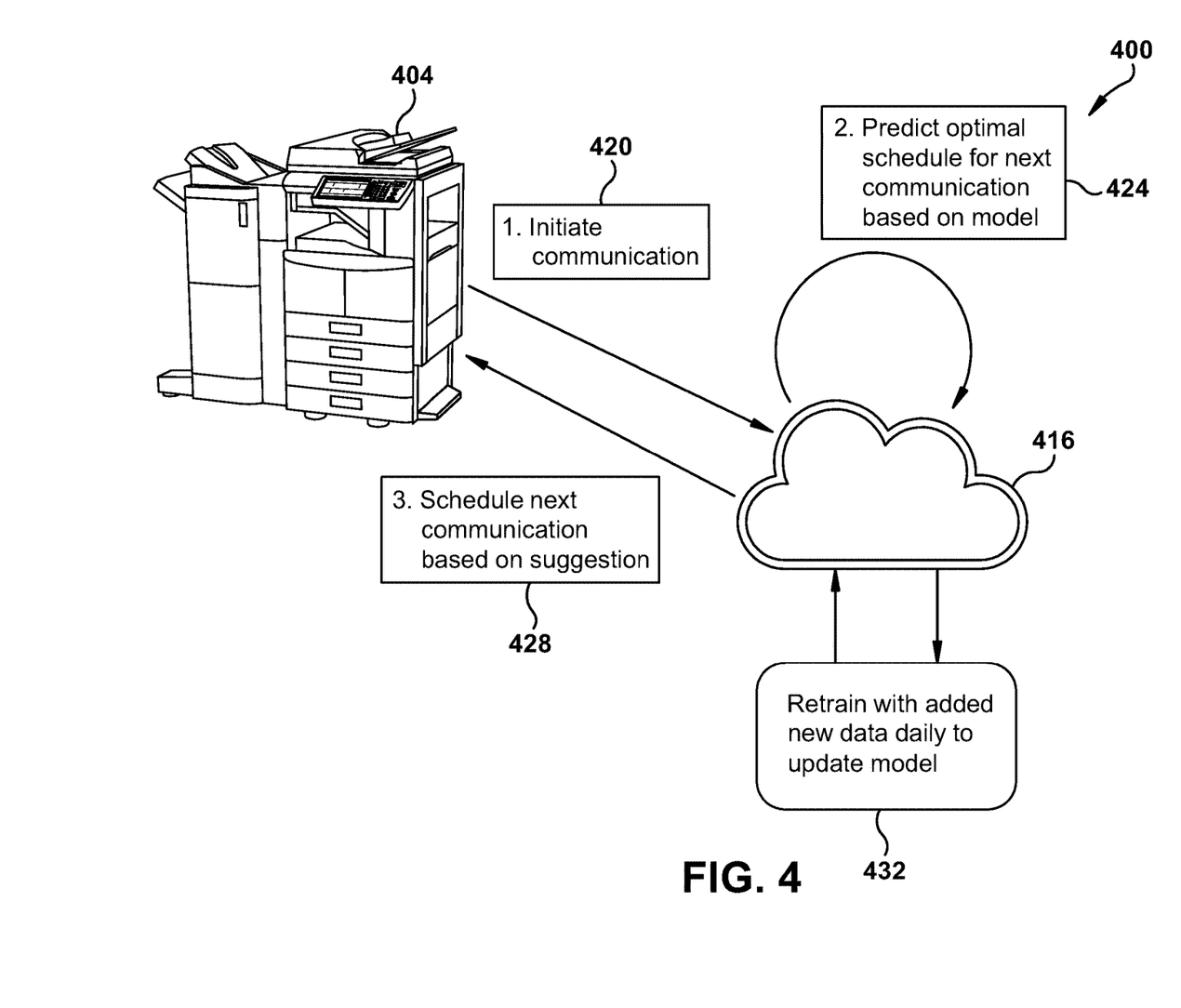
FIG. 4 is an example embodiment of a networked device report scheduling system.

FIG. 4 illustrates an example embodiment of a networked device report scheduling system 400 wherein a server (not shown), which can be a cloud-based service, directs reporting of MFP 404 via network cloud 416. In the illustrated example, MFP 404 reports to the server in accordance with a previously set schedule. MFP 404 initiates server communication one or more times at block 420. Next, the server predicts an optimal reporting schedule based on a suitable model at block 424, and this is communicated to MFP 404 at block 428 which then reports under the new schedule. Continual or regular optimization, which can include retraining and updating the model, is suitably performed at block 432 as additional data, such as data resultant from a previously revised report schedule, becomes available.

Figure 5:
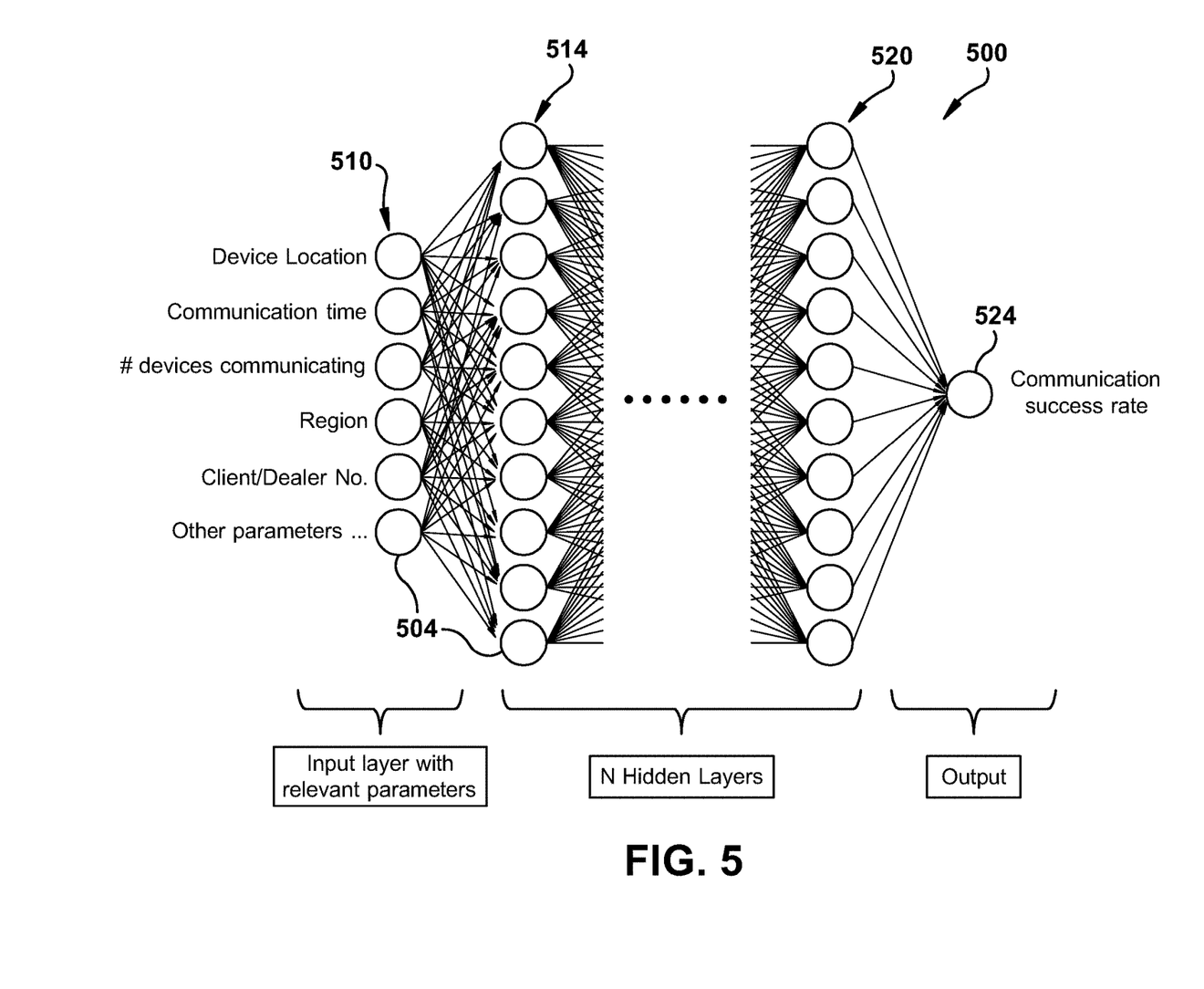
FIG. 5 is an example embodiment of an artificial intelligence system for device reporting schedule optimization.

FIG. 5 illustrates an example embodiment of an artificial intelligence (AI) system 500 for device reporting schedule optimization. In the example, AI system 500 is comprised of a neural network comprised of layered nodes, such as nodes 504. Input nodes 510 are provided with data, such as weighted value data, such as device location, communication time, number of devices communicating, region, client/dealer information, or any other suitable input parameter, including those noted above. Layers of neurons are interconnected with multiple layers, such as secondary layer 514, on to a final layer 520. Nodes are interconnected with data paths that function like neurons wherein weights are adjusted relative to information from nodes of a preceding layer. Outputs from the final layer 520 are suitably fed to output node 524 wherein a communication success rate is predicted.

Figure 6:
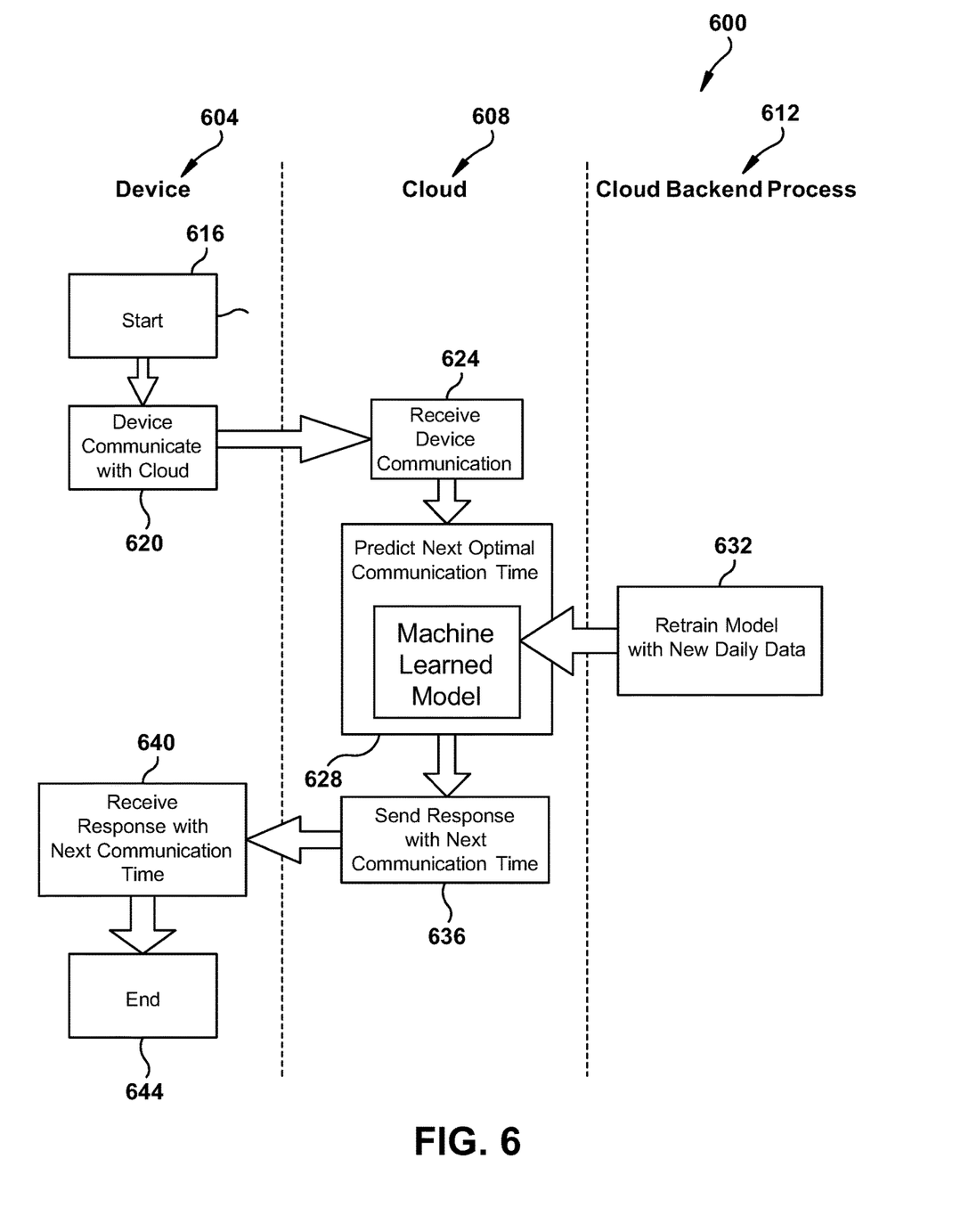
FIG. 6 is a workflow diagram of an example embodiment of a device reporting optimization system.

FIG. 6 illustrates an example embodiment of device workflow 600 relative to a device 604, cloud 608 and cloud backend process 612. The process commences at block 616 and a device, such as an MFP initiates cloud communication at block 620, which communication is received in the cloud at block 624. Predictive machine learning is performed at block 628 with regularly supplied data from block 632. This forms new communications scheduling which is sent at block 636 and received by the device at 640 for implementation. The process suitably ends at block 644.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
a processor and associated memory; and
a network interface configured for data communication with a multifunction peripheral,
wherein the memory is configured for storing reporting schedule data corresponding to a reporting schedule of the multifunction peripheral,
wherein the processor is configured to send the reporting schedule to the multifunction peripheral via the network interface,
wherein the processor is further configured to receive a plurality of service file sets from the multifunction peripheral via the network interface,
wherein the processor is further configured to determine a timing of receipt of each of the service file sets relative to timing specified the reporting schedule data,
wherein the processor is further configured to generate updated reporting schedule data in accordance with a determined timing, and
wherein the processor is further configured to send the updated reporting schedule data to the multifunction peripheral via the network interface.

2. The system of claim 1 wherein the processor is further configured to:
monitor network congestion via the network interface, and
generate the updated reporting schedule in accordance with monitored network congestion.

3. The system of claim 1 wherein the processor is further configured to generate the updated reporting schedule in accordance with temporal data.

4. The system of claim 3 wherein the temporal data is comprised of a time of day.

5. The system of claim 3 wherein the temporal data is comprised of a day of the week.

6. The system of claim 1 wherein the processor is further configured to generate the updated reporting schedule in accordance with a geographic location of the multifunction peripheral.

7. The system of claim 6 wherein the processor is further configured to generate the updated reporting schedule in accordance with laws applicable in the geographic location.

8. The system of claim 6 wherein the processor is configured to determine the geographic location in accordance with a geolocation system.

9. A method comprising:
communicating data with a multifunction peripheral via a network interface;
storing reporting schedule data corresponding to a reporting schedule of the multifunction peripheral in a memory;
sending the reporting schedule to the multifunction peripheral via the network interface;
receiving a plurality of service file sets from the multifunction peripheral;
determining, via a processor, a timing of receipt of each of the service file sets relative to timing specified the reporting schedule data;
generating updated reporting schedule data in accordance with a determined timing; and
sending the updated reporting schedule data to the multifunction peripheral via the network interface.

10. The method of claim 9 further comprising:
monitoring network congestion via the network interface; and
generating the updated reporting schedule in accordance with monitored network congestion.

11. The method of claim 9 further comprising generating the updated reporting schedule in accordance with temporal data.

12. The method of claim 11 wherein the temporal data is comprised of a time of day.

13. The method of claim 11 wherein the temporal data is comprised of a day of the week.

14. The method of claim 9 further comprising generating the updated reporting schedule in accordance with a geographic location of the multifunction peripheral.

15. The method of claim 14 further comprising generating the updated reporting schedule in accordance with laws applicable in the geographic location.

16. The method of claim 14 further comprising determining the geographic location in accordance with a geolocation system.

17. A system comprising:
a processor and associated memory; and
a network interface configured for data communication with each of a plurality of identified multifunction peripherals,
wherein the memory is configured for storing, for each multifunction peripheral, a corresponding storage schedule,
wherein the memory is further configured for storing location data corresponding to a location of each of the multifunction peripherals,
wherein the processor is configured to send each multifunction peripheral its corresponding storage schedule via the network interface,
wherein the processor is further configured to measure network characteristics between the network interface and each of the multifunction peripherals,
wherein the processor is further configured to receive a plurality of service file sets from each of the multifunction peripherals via the network interface,
wherein the processor is further configured to determine a timing of receipt of each of the service file sets relative to timing specified the reporting schedule data,
wherein the processor is further configured to generate updated reporting schedule data for each multifunction peripheral in accordance with its associated timing, location and network characteristics, and
wherein the processor is further configured to send corresponding updated reporting schedule data to each of the multifunction peripherals via the network interface.

18. The system of claim 17 wherein the processor is further configured to generate the location data in accordance with a geolocation of each multifunction peripheral.

19. The system of claim 18 wherein the memory is further configured for storing operational data corresponding to device operation rules associated with a location of at least one of the multifunction peripherals, and wherein the processor is further configured to generate the updated reporting schedule for the at least one multifunction peripheral in accordance with a device operation rule associated therewith.

20. The system of claim 19 wherein the device operation rule is directed to a power down mode or a sleep mode for the at least one multifunction peripheral.

* * * * *